UNITED STATES PATENT OFFICE.

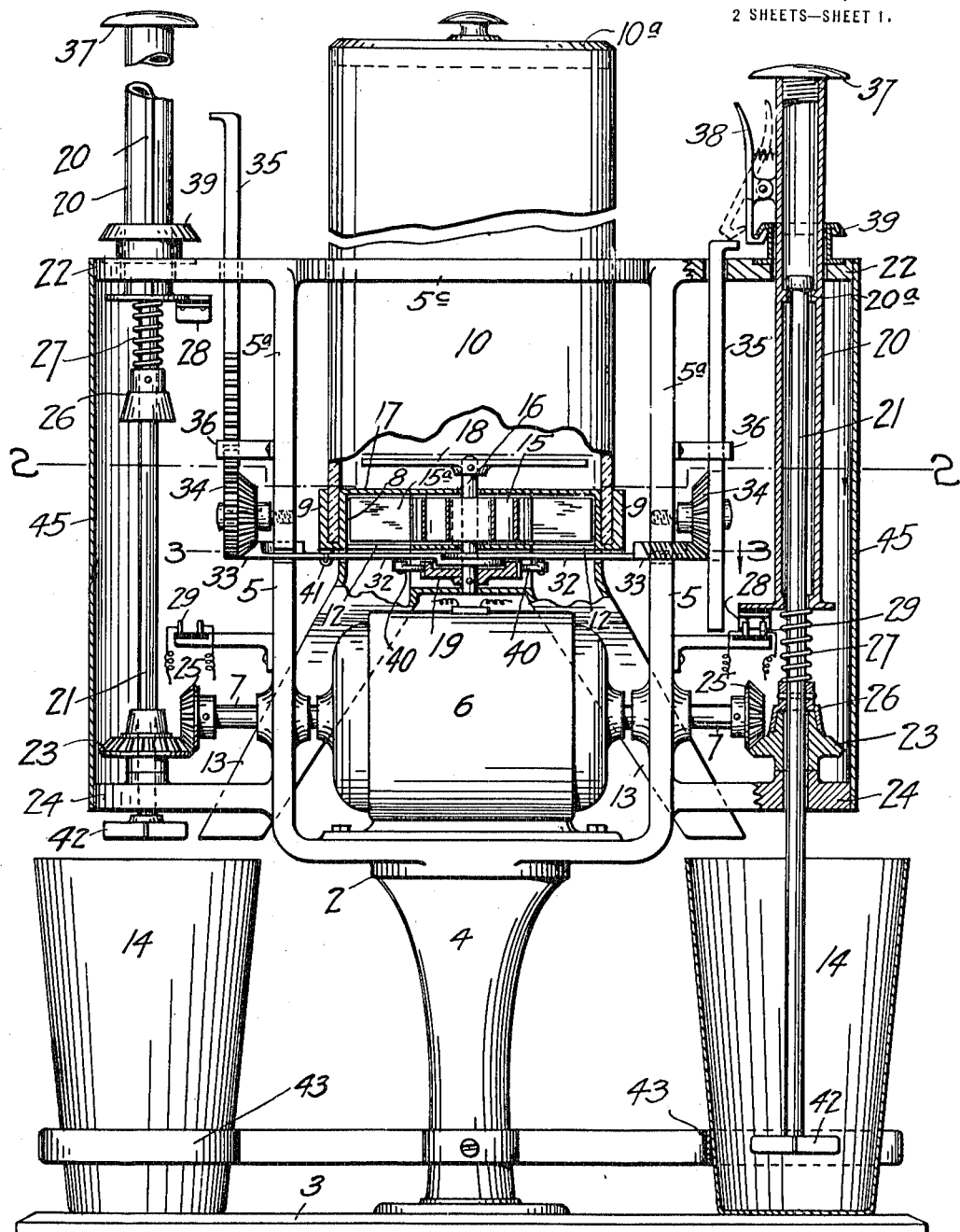

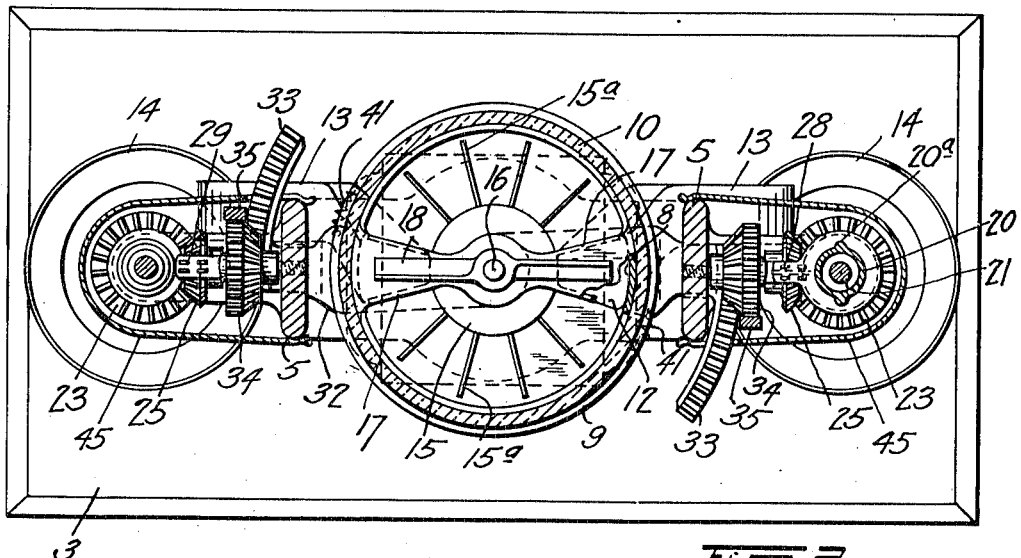
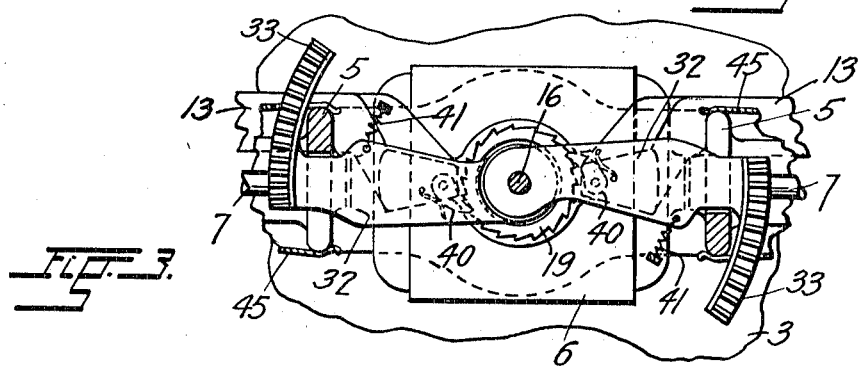
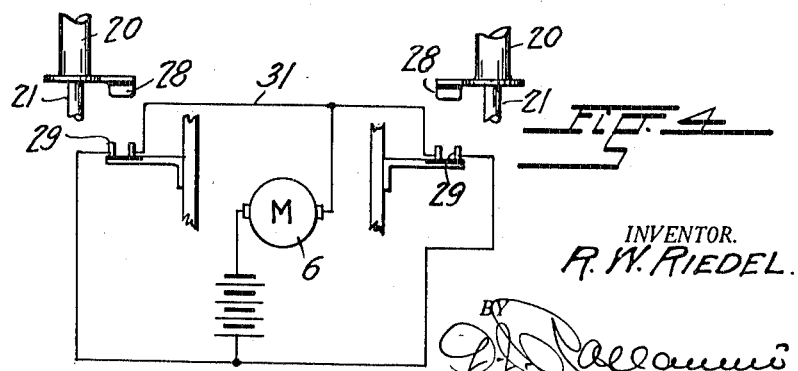

ROBERT W. RIEDEL, OF AULT, COLORADO.

BEVERAGE MIXER.

1,408,033.     Specification of Letters Patent.     Patented Feb. 28, 1922.

Application filed May 4, 1921. Serial No. 466,767.

*To all whom it may concern:*

Be it known that I, ROBERT W. RIEDEL, a citizen of the United States, residing at Ault, in the county of Weld and State of Colorado, have invented certain new and useful Improvements in Beverage Mixers, of which the following is a specification.

This invention relates to beverage mixers for soda fountains, and an object of the invention is to provide a mechanism of simple construction for the conjunctive operation of a stirring element and a dispensing device in apparatus of the type shown and described in my application for Patent No. 387,650, filed June 9, 1920 and allowed January 27, 1921.

Another object of the invention is to provide in combination with a dispensing device a plurality of stirring elements which are capable of separate or simultaneous operation, and still other objects reside in details of construction and novel arrangements of parts hereinafter described with reference to the accompanying drawings in the several views of which like parts are similarly designated, and in which—

Figure 1 is a sectional elevation of my improved mixing apparatus;

Figure 2, a horizontal section taken on the line 2—2, Figure 1;

Figure 3, a fragmentary section on the line 3—3, Figure 1, and

Figure 4, a diagrammatic view of the electrical connections between the motor and the stirring elements of the device.

Referring to the drawings by numerical reference characters, 2 designates a standard erected on a base 3 and composed of a pedestal 4 and a superposed frame 5 which has the bearings and other appurtenances necessary to support the various parts of the apparatus in their cooperative positions and to hold a container in place above the dispensing element of the same.

An electric motor 6 mounted on the pedestal has in connection with its rotary armature, a horizontal shaft 7 which is supported in bearings on the upright members $5^a$ of the frame.

Mounted in the frame above the motor is the dispensing element of the apparatus and at opposite sides of the same are two stirring elements adapted to mix the contents of drinking vessels or other containers supported on the base.

The dispensing element consists of a cylindrical pan 8 surrounded by a flange 9 which is spaced from its circumferential wall to hold a cylindrical container for malted milk powder or other similar ingredient of soda fountain beverages.

The upright container which is open at its ends extends through a ring $5^c$ at the top of the frame 5 and it is normally closed by a lid $10^a$ which fits inside the opening at its upper end.

The pan has in its bottom oppositely disposed delivery openings 12 which connect with downwardly slanting chutes 13 through which the contents of the container portioned in the operation of the dispenser, passes to the vessels 14 supported on the base.

Placed above the bottom of the pan for rotation about a central axis, is the portioning member 15 of the dispenser which is divided into a plurality of pockets by equidistantly disposed partitions $15^a$ projecting radially from a central hub. The hub is fixed on an upright shaft 16 which extends through a central opening in the bottom of the pan and through a therewith alined opening in a plate 17 which covers the pockets of the device above the delivery openings.

The shaft carries at its upper end a paddle 18 which functions to stir the contents of the container supported on the pan, and a ratchet wheel 19 mounted on the shaft below the pan constitutes a part of the operating mechanism of the dispensing element hereinafter to be described.

The stirring elements of the apparatus each consists of a tubular push rod 20 having internally a shoulder $20^a$ for the suspension of a headed shaft 21 extending partially below the same. The rod is slidably mounted in a bearing 22 on the adjacent upright of the supporting frame and the shaft carries at its lower extremity a stirring wheel 42 adapted to be placed inside a vessel on the base of the apparatus.

The shaft 21 passes loosely through a beveled gear wheel 23 which is rotatably supported on a bearing 24 of the standard in operative engagement with a corresponding gear 25 at the respective end of the motor shaft, and it carries a socketed clutch member 26 which by frictional engagement with a conical extension of the gear wheel 23, secures the rotative continuity of the same with the shaft when the latter is lowered to its operative position.

A coiled spring 27 between a shoulder on the clutch member and the lower end of the push rod aids in maintaining the members of the clutch in their cooperative relation.

The push rod 20 carries at its lower end the male member 28 of a knife blade electric switch the other member 29 of which is fastened upon a bracket 30 on the standard and connected in the circuit 31 of the motor 6 as shown in Figure 4 of the drawings.

The bracket is positioned with relation to the push rod to bring the switch members in conjunctive engagement at the same time that the clutch member 26 engages the gear wheel 23 so that when the stirring wheel 42 at the end of the shaft is immerged in the contents of the vessel on the base of the apparatus by downward movement of the push rod, it is, upon reaching a determinate position above the bottom of the vessel, rotated by the motor until, after the mixing action is completed, the rod is returned to its original position.

Pivotally connected with the shaft 16 of the portioning member of the dispensing element are two oppositely extending gates 32 which in their normal position close the delivery openings in the bottom of the dispensing element. Gear wheels 34 rotatably supported on stud shafts which project from the uprights of the frame, each have two toothed portions one of which meshes with a segmental rack 33 formed at the end of the respective gate and the other of which is operatively engaged by a rack on a bar 35 which is vertically slidably supported in an opening of the bearing 22 of the push rod at the same side of the apparatus, and a bearing 36 projecting laterally from the standard.

The tubular push rods 20 are closed at their upper ends by rounded screw caps 37 and they carry immediately beneath the same pivoted spring-pressed catches 38 which, when the rods are in their lowered position, engage with downwardly slanting flanges 39 on the bearings 22 in which they have their sliding motion.

The bars 35 have heads above the bearings 22, which when the spring catches on the respective push rods are pressed inwardly at their upper ends, are engaged by the opposite ends of the same to impart a longitudinal movement to the bars when the push rods with which the catches are connected, are pressed downwardly in the operation of the apparatus.

Longitudinal ribs 20$^b$ on the rods 20 fitting loosely in grooves of the respective bearings, prevent rotative movement of the rods and thereby maintain the alinement of the catches 38 with the heads of the respective rack bars and insure the conductive engagement of the moving members of the electric switches with those which are supported on the bracket 30.

Spring-pressed pawls 40 on the pivoted gates 32 engage with the teeth of the ratchet wheel 19 on the shaft of the portioning member of the dispensing element as best shown in Figure 3 of the drawings, and coiled springs 41 attached to relatively stationary parts of the apparatus serve to return the gates to their normal position after each operative movement thereof. Casings 45 fastened to the uprights 5$^a$ of the frame 5 enclose the parts of the operating mechanism of the apparatus at opposite sides thereof.

In the operation of my invention the contents of the upright container on the pan of the dispensing element enter the pockets between the partitions of the rotary portioning member excepting those which are covered by the plate 17 and which are in register with the delivery openings in the bottom of the pan.

The push rods 20 and the rack bars 35 of the mechanism which actuates the dispenser, are normally in the position shown at the left-hand side of Figure 1 of the drawings and the gates 32 are in the position in which they close the discharge openings below the bottom of the pan.

The vessels 14 containing beverages to be mixed in the operation of the device, are supported on the base and held beneath the stirring elements in spring clamps 43 which extend oppositely from the pedestal 4 of the supporting structure.

In order to mix the contents of one of the vessels together with a predetermined quantity of malted milk powder from the container 10, the operator pushes down on the respective rod 20 and at the same time pushes inwardly on the spring catch at the upper end thereof. The lower end of the catch moving outwardly from the plunger, engages the head of the respective rack bar 35 and causes it to move in conjunction with the push rod until the latter reaches the end of its downward movement as shown at the right hand side of Figure 1, when the members of the electric switch are in conductive engagement and the members of the clutch are in frictional contact with each other to secure the rotative continuity of the respective stirring shaft with the gear-wheel 23.

The spring catch upon being released engages beneath the flange 39 on the bearing 22 and thereby locks the push rod in its adjusted position.

The closing of the circuit of the electric motor in the switch and the simultaneous connection of the stirring shaft with the rotating armature of the same, imparts a rapid rotary motion to the stirring wheel at the end of the shaft which thereby mixes the ingredients contained in the vessel on the base.

The downward movement of the rack bar 35 caused the respective gate 32 to move about its pivot through the instrumentality of the gear wheel 34 and the rack 33 with the result that the respective discharge opening in the bottom of the pan is uncovered and a partial rotation is imparted to the rotary portioning member by means of the pawl and ratchet connection.

The pocket of the portioning member registering with the delivery opening prior to the operative movement of the same was empty owing to its position beneath the cover plate 17 while the other pockets were filled with the powdered substance passing thereinto from the container 10 and when by movement of the rack bar the member is partially rotated the next following compartment filled with the powdered material is brought in register with the delivery opening, with the result that its contents fall into the chute 13 beneath the opening and pass into the vessel on the base.

The movement of the powdered contents of the container to and from the pockets of the portioning device is accelerated by the action of the paddle 18 at the end of the rotating shaft 16.

When the mixing operation is completed the attendant releases the catch 38 from the flange on the bearing and thereby permits the parts to return to their original position which is automatically accomplished through the action of the spring 41 upon the gate 32 which through the medium of the rack bar 35 and the therewith engaging catch 38 is transmitted to the push rod 20.

During the return movement of the arm the pawl which caused the concurrent movement of the portioning member of the dispensing element, rides idly across the teeth of the ratchet wheel without disturbing the position of the member which remains at rest until one of the two stirring elements is again actuated in the manner hereinbefore described.

It will be understood that by the use of my invention each stirring element may be operated separately or simultaneously with the other and that during each operation a predetermined quantity of the powdered contents of the container is delivered into the vessel or vessels placed in the prescribed position on the base of the machine.

Having thus described my invention what I claim and desire to secure by Letters-Patent is:

1. In apparatus of the character described, a dispensing element, a relatively stationary electric motor, a mixing element mounted for downward adjustment, means for operating the dispensing element by downward motion of the mixing element, and means to effect the operation of the mixing element by the motor, at a determined point in the downward movement of the same.

2. In apparatus of the character described, a dispensing element having a portioning member, a gear in operative connection with said member, a movable rack bar cooperating with the gear, a mixing element mounted for downward adjustment, and means on the mixing element to actuate the rack bar.

3. In apparatus of the character described, a dispensing element having a portioning member, a rack connected with said member, a movable rack bar, a gear wheel transmitting the movement of the rack bar to the rack, a mixing element mounted for downward adjustment, and means on the mixing element to actuate the rack bar.

4. In apparatus of the character described, a dispensing element having a portioning member, a gear in operative connection with said member, a movable rackbar cooperating with the gear, a mixing element mounted for downward adjustment, a catch on the element adapted to impellently engage the rack bar, and means cooperative with the catch to lock the element in an adjusted position.

5. In apparatus of the character described, a dispensing element having a portioning member, a ratchet wheel connected with said member, a movable arm, a pawl on the arm, engaging with the wheel, a gear in operative connection with the arm, a movable rack bar cooperating with the gear, a mixing element mounted for downward adjustment, and means on the mixing element to actuate the rack bar.

6. In apparatus of the character described, a dispensing element having a portioning member and a delivery opening, a gate normally closing said opening and operatively connected with the member, a mixing element mounted for downward adjustment, and a gear actuated by movement of the mixing element to operate the gate.

7. In apparatus of the character described, a dispensing element having a portioning member, a plurality of mixing elements capable of downward adjustment, and means to operate the portioning member by downward movement of any one of the mixing elements.

8. In apparatus of the character described, a dispensing element having a plurality of delivery openings, and a portioning member cooperating therewith, a plurality of mixing elements mounted for downward adjustment, and means actuated by movement of any one of said mixing elements for the operation of said member in conjunction with a corresponding delivery opening.

9. In apparatus of the character described, a dispensing element having a plurality of delivery openings and a portioning member cooperating therewith, gates normally closing said openings, a plurality of mixing elements mounted for downward adjustment, and means actuated by movement of any one of said mixing elements, to adjust the gate of a corresponding delivery opening and operate the portioning member in conjunction with the same.

10. In apparatus of the character described, a dispensing element having a plurality of delivery openings and a portioning member cooperating therewith, gates normally closing said openings in operative connection with said member, a plurality of mixing elements mounted for downward adjustment, and means for operating any one gate by movement of a corresponding mixing element.

11. In apparatus of the character described, a dispensing element having a plurality of delivery openings, a ratchet wheel in connection with the member, gates normally closing the openings, pawls on the gates, engaging with the ratchet wheel, a plurality of mixing elements mounted for downward adjustment, and means for operating any one gate by movement of a corresponding mixing element.

In testimony whereof I have affixed my signature.

ROBERT W. RIEDEL.